United States Patent [19]
Lilley

[11] Patent Number: 5,881,437
[45] Date of Patent: Mar. 16, 1999

[54] MULTI-SIZED BOOT CLAMP

[75] Inventor: Albert Lilley, Barrie, Canada

[73] Assignee: St. Louis Stamping Inc., Barrie, Canada

[21] Appl. No.: 844,526

[22] Filed: Apr. 18, 1997

Related U.S. Application Data

[60] Provisional application No. 60/015,849 Apr. 19, 1996.
[51] Int. Cl.$^6$ ...................................................... B65D 63/02
[52] U.S. Cl. ...................................................... 24/20 CW
[58] Field of Search ............................... 24/20 R, 20 CW, 24/20 EE, 20 TT, 21, 22, 23 R, 23 EE

[56] References Cited

U.S. PATENT DOCUMENTS

| | | | |
|---|---|---|---|
| 5,105,509 | 4/1992 | Lilley | 24/20 CW X |
| 5,177,836 | 1/1993 | Kemmerich | 24/20 CW X |
| 5,235,729 | 8/1993 | Tiegs et al. | 24/20 R X |
| 5,339,496 | 8/1994 | Oetiker | 24/20 CW |
| 5,581,851 | 12/1996 | Nagano | 24/20 R |
| 5,669,113 | 9/1997 | Fay | 24/20 CW |

OTHER PUBLICATIONS

Oetiker Universal Clamps, Product Information on 7 and 10 mm Bandclamp from Oetiker website undated.
Band–It, Product In formation for Ultra–Lok from Band–It IDEX website, undated.
Spiral Tech Inc., undated, Product Release Sheet for SURE–FIT Variable–SIzing C.V. Boot Clamp.

*Primary Examiner*—James R. Brittain

[57] ABSTRACT

A boot clamp having open ends for lapping an lapping end over a lapped end in a lapping direction. The boot clamp includes an ear for tightening the clamping band about an object to be fastened, and a mechanical interlock for interlocking the lapping end to the lapped end. The interlock has a several inwardly extending spaced hooks having a blunted end on the lapping end and a series of spaced apertures having tabs on the lapped end. The hooks extend in a direction opposite the lapping direction and the tabs extend in the lapping direction. Deformation of the ear causes the hooks to underlap the tab to interlock the lapping end to the lapped end. The clamping band has a retainer mechanism to control and retain the lapped end under the lapping portion of the clamping band.

9 Claims, 3 Drawing Sheets

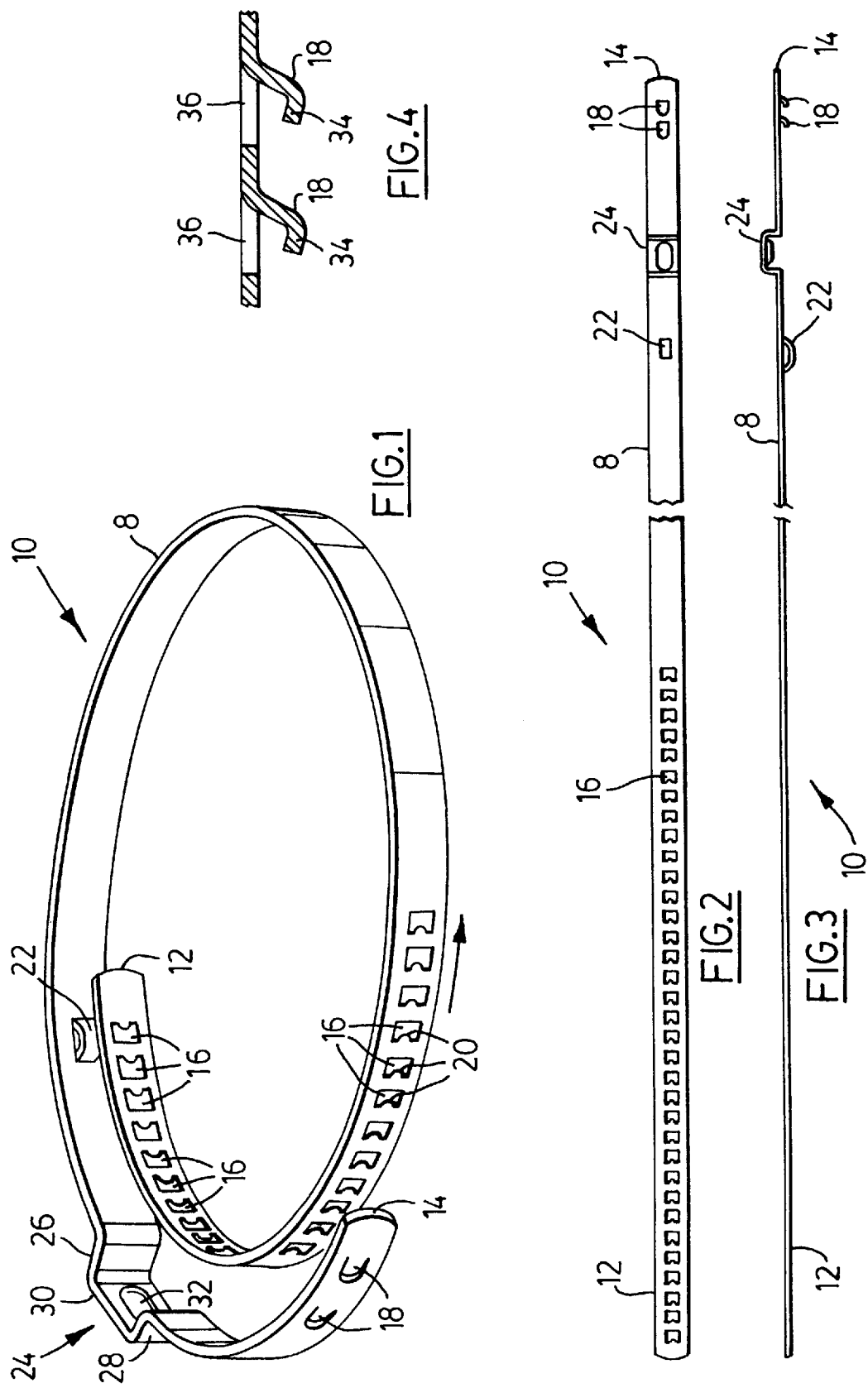

MULTI-SIZED BOOT CLAMP

This application claims the benefit of U.S. Provisional Application No. 60/015,849, filed Apr. 19, 1996.

FIELD OF INVENTION

This invention relates to boot clamps. In particular, this invention relates to automotive boot clamps having a size for applying the boot clamp to a broad range of diameters.

BACKGROUND OF THE INVENTION

Automotive boots clamps are well know in the industry. Boot clamps are used to seal rubber boots which protect constant velocity (CV) joints used in front wheel drive vehicles. Such boots clamps are described in commonly owned U. S. Pat. No. 5,105,509 (the "Lilley Clamp").

The Lilley Clamp has a pair of outwardly extending hooks on the lapped end of the clamp and a plurality of hook apertures having a tab on the lapping end. When the clamp ear is crimped, the tabs deform absorbing the clamping forces and interlocking with the hooks for interlocking the lapping end to the lapped end.

Boot clamps are destroyed during the repair or rebuilding of the CV joints. As a result, a strong after market has developed to supply parts, including boot clamps, for the repair and rebuilding of CV joints.

It is very common for kits to include the necessary parts for a rebuild of a CV joint. The kit will include two boot clamps for each boot to be replaced. For each CV joint, the boot has one wide end and one narrow end. Accordingly, the two boot clamps must be two different sizes, which are specified by the manufacturer. If the clamps which are included in the kit are too large or too small, then the CV joint cannot be properly re-assembled.

The automotive industry normally operates to a 97.3% assurance level. Even with this confidence level, there is a significant number of occurences where a CV joint rebuild kit will be provided with boot clamps which are not properly sized so that the rebuild job cannot be completed until another pair of clamps is re-ordered and delivered, delaying the return of the vehicle to the owner. The inconvenience for the vehicle owner cannot be measured.

The conventional boot clamp, such as the Lilley Clamp, cannot simply be made larger to accomodate a larger range of sizes. When such a clamp is used on smaller diameter sizes, a long tail of excess strapping is left presenting a danger to the boot. Even if the tail is cut off, the resulting sharp corners could eventually damage the boot.

Initially, it was believed that it was not possible to reverse the interlock of the conventional clamp and position the hooks on the lapping end and the apertures on the lapped end. In U.S. Pat. No. 4,222,155, the hooks of the boot clamp are directed inwardly. On crimping the ear, the inwardly extending hooks may penetrate into the rubber boot causing damage to the boot. Unfortunately, the damage cannot be detected for several months after the repair.

SUMMARY OF THE INVENTION

The disadvantages of the prior art may be overcome by providing a hose clamp having a plurality of hooks on the lapping end for engaging with a plurality of hook apertures on the lapped end. The hook apertures have a tab in the lapping direction and the plurality of hooks each has a blunted remote end such upon crimping the ear, the aperture tabs will interlock with the hooks and the blunted end of the hook will deflect the hook into a circumferential plane.

It is desirable to provide a boot clamp wherein the tail portion of the clamp after crimping will be the lapped end.

It is desirable to provide a boot clamp wherein the lapped end has a plurality of tabbed apertures for receiving hooks in a plurality of positions for sizing the crimped diameter of the boot clamp.

According to one embodiment of the invention, there is provided a boot clamp having open ends for lapping a lapping end over a lapped end in a lapping direction. A tightening ear is provided in the clamping band for tightening the clamping band about an object. Mechanical interlocking means, for interlocking the lapping end to the lapped end, comprise a plurality of inwardly extending hooks on the lapping end, each having a blunted end; and a series of spaced apertures on the lapped end having tabs extending in the lapping direction while the hooks extend in a direction opposite the lapping direction. The hooks can be received in a plurality of positions for circumferentially sizing the clamp.

According to one aspect, there is provided a boot clamp having a lapping end, a lapped end and an ear intermediate the ends thereof. The lapped end has a plurality of hook apertures, each aperture having a tab directed in the lapping direction. The lapping end has a pair of inwardly extending hooks directed opposite the lapping direction. Each hook has a blunted remote end thereof. The lapping end is lapped over the lapped end and then the hooks engage a pair of apertures at a desired circumferential distance. On crimping the ear, the aperture tabs deform with the hooks, the blunted end of the the hooks deflects the hooks into a circumferential plane.

According to a further aspect, there is provided a boot clamp having a lapping end, a lapped end and an ear intermediate the ends thereof. The lapped end has a plurality of hook apertures, each aperture having a tab directed in the lapping direction. The lapping end has a pair of inwardly extending hooks directed opposite the lapping direction. Each hook has a blunted remote end thereof. An inwardly directed dimple is positioned intermediate the ear and the hook apertures. The lapping end is lapped over the lapped end whereby the hooks engage a pair of apertures at a desired circumferential distance, and the dimple engages an aligned aperture to position the lapped end. On crimping the ear, the aligned aperture moves opposite the lapping direction and another aperture is aligned with the dimple to retain the lapped end.

According to a further aspect, there is provided a boot clamp having a lapping end, a lapped end and an ear intermediate the ends thereof. The lapped end has a plurality of hook apertures, each aperture having a tab directed in the lapping direction. The lapping end has a pair of inwardly extending hooks directed opposite the lapping direction. Each hook has a blunted remote end. An outwardly directed dimple is positioned at the lapped end, and a guide slot is pierced between the ear and the series of apertures. The lapping end is lapped over the lapped end whereby the hooks engage a pair of apertures at a desired circumferential distance, and the dimple engages the guide slot to position the lapped end. On crimping the ear, the dimple cooperates with the guide slot to retain the lapped end under the lapping portion of the boot clamp.

DESCRIPTION OF THE DRAWINGS

In drawings which illustrate embodiments of the invention,

FIG. 1 is a perspective view of an embodiment of the boot clamp of the present invention;

FIG. 2 is a top plan view of the embodiment of FIG. 1 in an unrolled condition;

FIG. 3 is a side elevational view of the embodiment of FIG. 2;

FIG. 4 is a side sectional view of the hooks of the embodiment of FIG. 1;

DETAILED DESCRIPTION OF THE PREFERRED EMBODIMENT OF THE INVENTION

Figure 6:
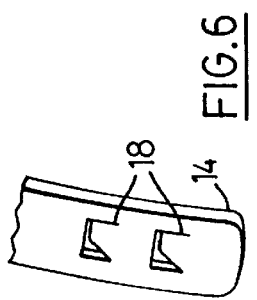
FIG. 6 is a partial perspective view of the lapping end of the embodiment of FIG. 1.

Referring to FIGS. 1 through 3, an embodiment of the clamp of the present invention is generally illustrated as 10. Clamp 10 generally comprises a thin band 8 of sheet metal, preferably stainless steel.

Clamp band 8 comprises a lapped end 12 and a lapping end 14. The direction moving from the lapped end 12 to the lapping end 14 defines a lapping direction, as illustrated by the arrow in FIG. 1.

Lapped end 12 has a series of spaced apertures 16 which extend circumferentially of the clamp band 8. Preferably, spaced apertures 16 have a substantially square outline having a tab 20. Tabs 20 extend in a lapping direction. It is readily understood that the shaping of the apertures is not critical, provided sufficient strength remains in the clamp band 8 after lancing or piercing the apertures.

Next along the clamp band 8 in the lapping direction is a dimple 22 which extends inwardly. Dimple 22 is formed by lancing two parallel cuts and punching the metal inwardly to form dimple 22. The distance between parallel slots to form dimple 22 is less than the distance between the longitudinal edges of aperture 16. Dimple 22 is positioned along clamp band 8 to extend inwardly into one of the apertures 16, but is adapted not to extend beyond the thickness of clamp band 8.

Next along the clamp band 8 is ear 24. Ear 24 is formed of the clamp band 8 and has outwardly extending leg portions 26 and 28 and interconnecting bridging portion 30. Bridging portion 30 has an inwardly formed emboss 32.

Figure 5:
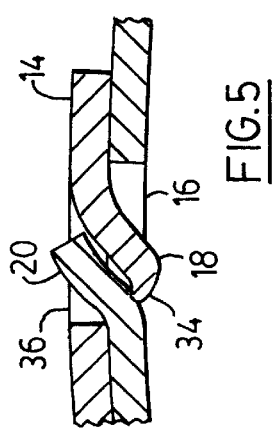
FIG. 5 is a partial sectional view illustrating the mechanical interconnection during the crimping process.

Next along the clamp band 8 at the lapping end 14 is a pair of spaced hooks 18. Hooks 18 are lanced by cutting a U-shaped cut through clamp band 8. Referring to FIGS. 4 and 6, the hooks 18 are then bent inwardly from the surface of the clamp band 8 in a direction opposite the lapping direction. As shown in FIG. 4, the hooks 18 have a blunted tip 34. The blunted tip 34 may be formed by bending the remote end of the hook upwards towards itself. Alternatively, blunted tip 34 may be formed by pressing and deforming the remote end to form a blunted tip 34 as shown in FIG. 5.

Apertures 16 are spaced at predetermined distances along the length of the clamp band 8. Hooks 18 are also spaced at the same predetermined distances to align with any two adjacent apertures 16. Dimple 22 is positioned along the clamp band 8 such that it will align with an aperture 16 when hooks 18 interlock with apertures 16 and ear 24 is deformed, as is more fully described below.

In operation, the clamp 10 is placed about an object to be clamped. For instance, clamp 10 of the present invention is commonly used to retain a flexible boot about a constant velocity joint, commonly used on front wheel drive vehicles.

The clamp is placed about the object and the lapping end 14 is overlapped over the lapped end 12. In this position, the hooks 18 will extend inwardly through two adjacent apertures 16. Depending on the two adjacent apertures selected, the lapped end 12 will circumferentially extend beyong dimple 22 and will rest in a corresponding aperture 16 nearer the lapped end 12. The dimple 22 will assist in controlling the lapped end by positioning and retaining the lapped end 12 under the lapping portion of claim band 8.

Ear 24 is then deformed in a manner well known in the art by applying a force at the base of legs 26 and 28 until the opposite leg members contact each other. Dimple 22 will slide a corresponding distance relative to the lapped end 12. Preferably, the length of the bridging portion 32 will be approximate the distance of two adjacent apertures 16. In this manner, dimple 22 will be displaced two apertures 16 and will rest in the second aperture to abut therewith retaining the lapped end 12 under the lapping portion of clamp band 8.

Referring to FIG. 5, as the ear 24 is contracted, tab 20 will abut firmly with hook 18. Upon further contraction of the ear 24, tab 20 will deform outwardly as hook 18 deforms inwardly increasing engagement between the lapping end 14 and lapped end 12. Upon completion of the crimping process, tab 20 will be fully registered within the hook aperture 36 and hook 18 will underlap tab 20 to securely connect the open ends of clamp 10 together providing clamping forces retaining the clamp about the object.

Figure 8:
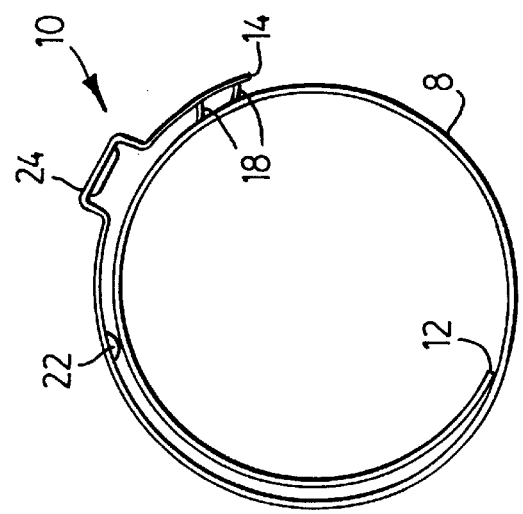
FIG. 8 is an elevational view of the embodiment of FIG. 1 in a contracted condition.
Figure 7:
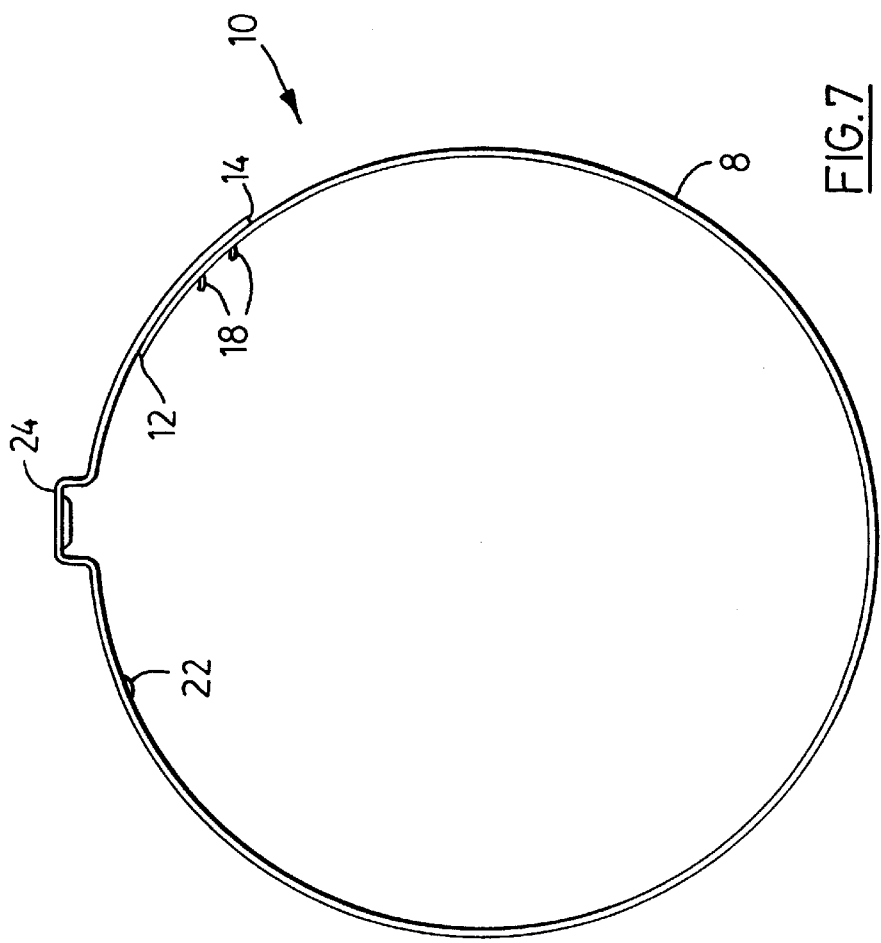
FIG. 7 is elevational view of the embodiment of FIG. 1 in an expanded condition.

FIGS. 7 and 8 show the clamp 10 in its largest and smallest configurations, respectively, prior to contraction of ear 24. In FIG. 7, hooks 18, at lapping end 14, are enmeshed in adjacent apertures 16 nearest lapped end 12. In this fully expanded condition, lapped end 12 does not extend to and engage with dimple 22. In FIG. 8, hooks 18, at lapping end 14, extend inwardly through adjacent apertures 16 which are further from lapped end 12 in the lapping direction. In this fully contracted condition, lapped end 12 extends significantly beyond dimple 22 and dimple 22 extends inwardly into an aligned aperture. As will be apparent to those skilled in the art, clamp 10 may be sized to an intermediate condition by positioning hooks 18 in adjacent apertures between the apertures nearest and farthest from lapped end 12.

Figure 9:
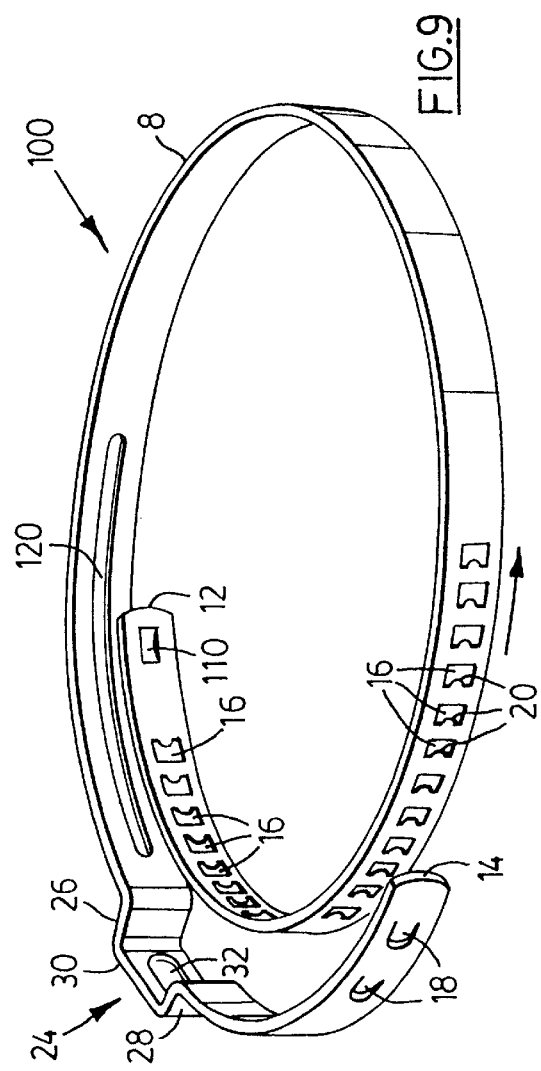
FIG. 9 is a perspective view of a further embodiment of the boot clamp of the present invention.

FIG. 9 shows another embodiment of the present invention. Clamp 100 is identical in all respects to clamp 10, except that dimple 22 has been removed and an alternate means of positioning and retaining the lapped end 12 is provided by an outwardly extending dimple 110 and a guide slot 120. Dimple 110 is formed by lancing two circumferentially parallel slots at lapped end 12, and punching the metal outwardly. Guide slot 120 can be formed by lancing two cuts and either removing the material therebetween, or punching the material outwardly. The distance between parallel slots to form dimple 110 is less than the distance between the longitudinal edges of guide slot 120. Dimple 110 will extend outwardly into guide slot 120. In operation, dimple 110 cooperates with guide slot 120 to control the lapped end 12 under the lapping portion of the clamp band 8.

In the illustrated embodiments, the apertures 16 and the hooks 18 are spaced at 5 mm intervals which produces a change in diameter of 1.5 mm. The series of apertures 16 extend for 42 mm to produce a clamp 10 which has a range of preferably from 75 mm to 124 mm or from 30 mm to 49 mm.

Although the disclosure describes and illustrates preferred embodiments of the invention, it is to be understood that the invention is not limited to the particular embodiments. Many variations and modifications will now occur to those skilled in the art.

I claim:

1. An adjustable clamp having a clamping band, a lapped end, a lapping end for overlapping the lapped end, and a tightening ear in the clamping band for tightening the clamping band about an object, comprising:

at least two inwardly extending hooks on the lapping end having blunted tips to non-destructively engage said object, and a series of spaced apertures on said lapped end, at least two of said spaced apertures receiving the blunted tips of the hooks such that the blunted tips extend beyond the inner side of the lapped end to circumferentially size said clamp, each of said apertures having a tab, extending substantially in the plane of the clamping band, to engage a received hook and to deform and interlock therewith when said tightening ear is actuated to tighten said clamp.

2. An adjustable clamp according to claim 1 wherein said clamping band includes a retainer for retaining said lapped end under said lapping end.

3. An adjustable clamp according to claim 2 wherein said retainer is a dimple extending inwardly from said lapping end for engaging one of said apertures.

4. A clamp according to claim 2 wherein said retainer comprises a guide slot extending beyond said hooks along said lapping end, and an outwardly extending dimple on said lapped end for engaging said guide slot.

5. A clamp according to claim 1 wherein said series of apertures are equally spaced substantially halfway around said clamping band.

6. A clamp according to claim 1 wherein each said hooks is defined by a substantially U-shaped cut portion bent inwardly from said lapping end.

7. A clamp according to claim 6 wherein an end of each said hooks is pressed for forming said blunt tip.

8. A clamp according to claim 1 wherein an end of each said hook is bent upwards towards said lapping end for forming said blunt tip.

9. A clamp according to claim 1 wherein said object is a boot for a constant velocity joint assembly.

\* \* \* \* \*